(12) United States Patent
Meaney et al.

(10) Patent No.: US 10,698,586 B2
(45) Date of Patent: Jun. 30, 2020

(54) DATA VISUALIZATION THROUGH USE OF LINKED CHARTS

(71) Applicant: Amazon Technologies, Inc., Seattle, WA (US)

(72) Inventors: Michael Patrick Meaney, Dublin (IE); Joel Louis Coffey, Dublin (IE)

(73) Assignee: Amazon Technologies, Inc., Seattle, WA (US)

(*) Notice: Subject to any disclaimer, the term of this patent is extended or adjusted under 35 U.S.C. 154(b) by 76 days.

(21) Appl. No.: 14/617,633

(22) Filed: Feb. 9, 2015

(65) Prior Publication Data
US 2016/0231900 A1    Aug. 11, 2016

(51) Int. Cl.
| | | |
|---|---|---|
| *G06F 3/048* | (2013.01) | |
| *G06F 3/0484* | (2013.01) | |
| *G06F 3/0482* | (2013.01) | |
| *G06F 9/451* | (2018.01) | |
| *G06F 16/954* | (2019.01) | |
| *G06T 11/20* | (2006.01) | |
| *G06F 16/904* | (2019.01) | |
| *G06F 16/26* | (2019.01) | |

(52) U.S. Cl.
CPC ........ *G06F 3/04842* (2013.01); *G06F 3/0482* (2013.01); *G06F 9/451* (2018.02); *G06F 16/26* (2019.01); *G06F 16/904* (2019.01); *G06F 16/954* (2019.01); *G06T 11/206* (2013.01)

(58) Field of Classification Search
CPC ........ G06T 11/206; G06F 2203/04803; G06F 3/04886; G06F 17/30572
USPC .......................................................... 345/440
See application file for complete search history.

(56) References Cited

U.S. PATENT DOCUMENTS

| | | | |
|---|---|---|---|
| 6,707,454 B1* | 3/2004 | Barg | G06F 17/246 345/440 |
| 10,048,825 B2* | 8/2018 | Bertram | G06F 16/248 |
| 2009/0256846 A1 | 10/2009 | Zahariev | |
| 2012/0017165 A1* | 1/2012 | Gardner | H04L 67/36 715/771 |
| 2012/0272186 A1* | 10/2012 | Kraut | G06F 3/0488 715/810 |
| 2013/0086107 A1* | 4/2013 | Genochio | G06F 17/30572 707/769 |
| 2013/0166507 A1 | 6/2013 | Staczek | |

(Continued)

OTHER PUBLICATIONS

International Search Report and Written Opinion dated May 2, 2016, International Patent Application No. PCT/US2016/015475, filed Jan. 28, 2016.

*Primary Examiner* — Alex Olshannikov
(74) *Attorney, Agent, or Firm* — Davis Wright Tremaine LLP

(57) ABSTRACT

A user provides input to a graphical user interface to transform a chart that is linked to other charts presented to the user through the interface. In response to this input, the chart is transformed and updated. This transformation may cause the chart to make available a transformation event to a queue, which may cause other linked charts to obtain the transformation event and determine what transformations need to be performed within these other linked charts. Based at least in part on this transformation event, the other linked charts may obtain any necessary data and may perform the necessary transformations mirror the transformations performed for the original chart.

21 Claims, 10 Drawing Sheets

(56) References Cited

U.S. PATENT DOCUMENTS

| | | | |
|---|---|---|---|
| 2013/0286039 A1* | 10/2013 | Hao | G06Q 30/02 345/593 |
| 2015/0186473 A1* | 7/2015 | Chen | G06F 17/30554 707/603 |
| 2017/0139894 A1* | 5/2017 | Welch | G06Q 10/0639 |

* cited by examiner

DATA VISUALIZATION THROUGH USE OF LINKED CHARTS

BACKGROUND

Customers, administrators, and other users often utilize a variety of charts and other data visualization methods to analyze their resources and identify any trends or anomalies that may need to be addressed. For instance, these customers, administrators, and other users may utilize a graphical user interface (GUI) to generate various charts for their computing resources according to certain data metrics. However, when a customer, administrator, or other user wishes to modify the various charts within the GUI to view all data within a particular data range, the customer, administrator, or other user may be required to modify each chart individually to achieve the desired visualization. This may be a labor-intensive and time-intensive process; as such modifications may require various operations to achieve the desired results.

BRIEF DESCRIPTION OF THE DRAWINGS

Various embodiments in accordance with the present disclosure will be described with reference to the drawings, in which.

DETAILED DESCRIPTION

Figure 1:
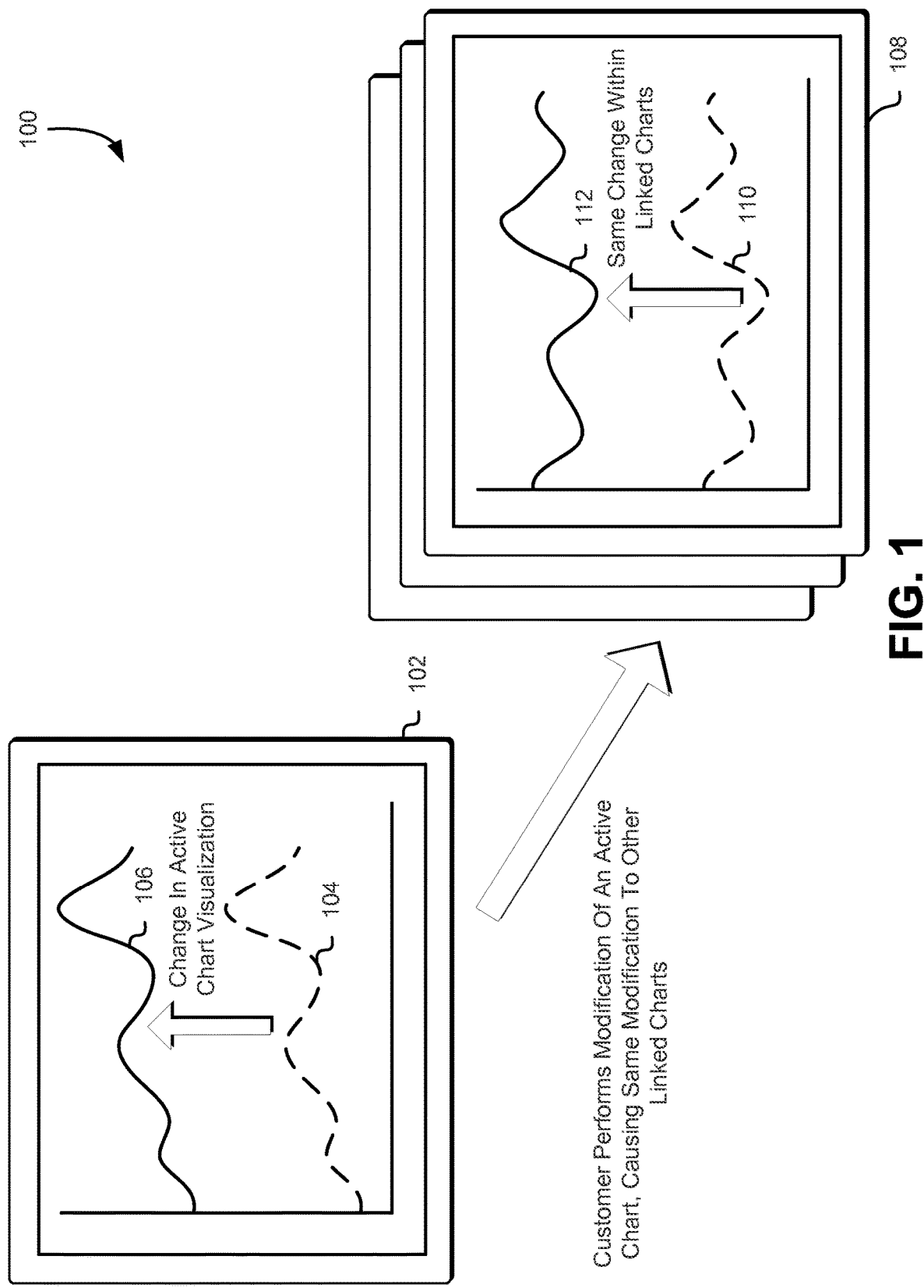
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested relates to the utilization of linked charts for data visualization across a variety of data metrics and resources. In an embodiment, an entity (e.g., an organization) accesses, through use of a user client such as a browser application, a GUI provided by an analytics service to generate a variety of charts that may be utilized to visualize data for the entity's computing resources. For each chart, the entity may define the resources for which data is to be displayed, as well as the data metrics to be utilized. For example, the entity may request creation of a chart that, when generated, will display central processing unit (CPU) usage for each of the entity's provisioned computing resources over a particular time range. Each chart may be configured to provide a visual representation of a variety of data metrics based on the entity's requirements and preferences. The entity may be a customer of a computing resource service provider that may provision a variety of computing resources through the myriad services provided by this computing resource service provider. Alternatively, the entity may be an administrator of various computing resources provided by the computing resource service provider to its customers and other users.

In an embodiment, the GUI includes a toggle that, when selected by the entity, may cause the analytics service to link a variety of charts together. For instance, each chart displayed within the GUI may include an executable code configured to evaluate any user inputs provided by the entity through the GUI to determine whether a data transformation needs to be performed. For example, in some embodiments, each chart may include a scroll bar along each chart axis, which the entity may use to define a new data metric range for which data should be transformed and presented. The executable code associated with the particular chart may utilize these user inputs to determine what transformation is to be performed. If the requested transformation is not trivial (e.g., the transformation requires the chart to be updated, etc.), the executable code may access a remote data repository to obtain the data required for the specified transformation. This remote data repository may include data obtained from a variety of services provided by the computing resource service provider. The analytics service, once the data has been obtained from the remote data repository, may provide the data to the chart executable code to enable the chart executable code to apply the requested transformation to the chart and present the transformed data to the entity through the GUI.

Once the transformation has been applied and the chart has been updated to display the transformed data for the entity, the analytics server may make available a transformation event to an event queue (e.g., event bus) maintained by analytic service or other service provided by a computing resource service provider. This queue may include a queue of transformation events that are to be performed for each chart that is linked to the chart transformed as a result of the entity's interaction with the chart through the GUI. Each chart may be supported by an executable code, which may be configured to access this queue in response to a triggering event (e.g., after a period of time has passed, detection of new events added to the event queue, etc.) to determine whether there are any transformation events available that are applicable for the particular chart. If so, the executable code may utilize this transformation event to determine the transformation that is to be performed, obtain the necessary data to present to the entity through the chart and the GUI, and apply the required transformation. Note that, while the present disclosure uses event queues for the purpose of illustration of a particular embodiment, the communication of events may be communicated in various ways in various embodiments, and the particular mechanism for intra-process communication or, generally, for the communication of information to enable update of a chart as a result of an update made to another chart may vary and may depend on the particular implementation.

In this manner, an entity may be able to update a variety of linked charts automatically through a transformation of the data presented through a single chart in the GUI. Additionally, the techniques described and suggested herein facilitate additional technical advantages. For example, because, in some embodiments, the entity may perform all operations within a single chart to cause all other charts presented to the entity to be updated such that the data presented corresponds to a particular data metric range, the entity may quickly evaluate various data metrics for a particular set of computing resources without having to make additional adjustments to other charts or being preoccupied with ensuring that the requested data is present among various charts displayed through the GUI. Additionally, since the linked charts may share a common data metric range for a particular variable, these charts may be ready for presentation purposes, enabling the entity to quickly generate a report for a particular data metric range.

FIG. 1 shows an illustrative example of an environment 100 in which various embodiments can be implemented. In the environment 100, a customer of a computing resource service provider may access a GUI provided by an analytics service to generate one or more charts 102, 108, which may be used to obtain a graphical representation of data. For instance, through the GUI, a customer may submit a request to the analytics service to generate a chart 102 that includes data for one or more computing resources provisioned on behalf of the customer. The chart 102 may present the requested data for these one or more computing resources through the use of a data line 104 on a two or three-dimensional chart. These charts 102 may thus include two or more data axes. In some embodiments, one axis of the two or more axes may be devoted to time. For instance, when the customer submits a request to the analytics service to generate a chart, the customer may specify a time range for which the data is to be presented (e.g., minutes, hours, days, etc.). Based at least in part on the customer's preferences, the analytics service may generate the chart 102 with one or more data lines 104 corresponding to the customer's computing resources.

In an embodiment, a customer can utilize the GUI to generate a plurality of charts 108 in addition to the original chart 102 created. For this plurality of charts 108, the customer may again specify a time range for each chart 108 and the appropriate data metric that is to be analyzed through each of these charts 108. This time range may, in some instances, be different from the time range specified for the original chart 102. For example, the other charts 108 may include data for a different data metric range or time range than presented in the original chart 102. When a chart 102, 108 is generated, the chart 102, 108 may include one or more navigational user interface elements, such as a scroll bars, zoom bounding boxes, panning cursors, and the like. A customer may use these navigational user interface elements to navigate through the chart 102, 108. For instance, a customer may utilize the navigational user interface elements to, among other things, zoom in on one or more axes of the chart 102, 108, perform a bounding box zoom into a particular portion of the charts 102, 108, scroll through the chart 102, 108 for the number of dimensions of the chart 102, 108, and the like. It should be noted that the chart 102, 108 may include two or more dimensions, such that the navigational user interface elements may be used to manipulate the charts 102, 108 through any of these two or more dimensions.

This navigational user interface element, as will be described in greater detail below, may be updated in proportion to the amount of available data for the associated data metric and the data metric range displayed on the chart 102, 108. Additionally, the analytics service, through the GUI, may enable a customer to utilize a cursor or other tactile input (e.g., for a touchscreen display) to zoom into a particular portion of a chart 102, 108 or zoom out to obtain a wider range of data. When the customer zooms in or out within a chart 102, 108, the analytics server may cause the GUI to update the navigational user interface elements in proportion to the change to the displayed data metric ranges resulting from either zooming in or out of the chart 102, 108.

As will be described in greater detail below, the GUI provided by the analytics service may include a link charts toggle, which, when selected by the user, may cause the charts 102, 108 to be linked. When the customer selects a refresh button to refresh each chart 102, 108 displayed through the GUI, a transformation event may be generated based at least in part on the present data metric ranges included within the active chart 102. For instance, if the chart 102 includes data for a particular data range, as defined by one axis of the chart 102, the analytics service may generate a transformation event that, when utilized, may cause the other charts 108 to be updated such that the same particular data range is represented within these other charts 108 as well. Thus, upon transformation, the charts 102, 108 presented within the GUI may share the same data metric axis and the same data metric range. These transformation events may be stored within an event queue provided by the analytics service or another service maintained by a computing resource service provider. It should be noted that in other embodiments, the transformation events may be stored in a manner in which the transformation events may be retrieved by executable code or a sub-routine of each chart 102, 108.

Each chart 102, 108 may be provided by the analytics service through an executable code that is launched for each generated chart 102, 108. This executable code may be configured to access the queue in response to a triggering event. For instance, the executable code may access the queue after a certain period of time has passed. Alternatively, the executable code may access the queue upon detection of a transformation performed within any of the other charts within the GUI. The executable code may obtain the transformation event from the queue and determine what transformation is to be performed. For instance, as illustrated in FIG. 1, if a customer interacts with a chart 102 to change a particular axis range such that a data line 104 is transposed to a new position, as illustrated by data line 106, the analytics service may record this transformation of the chart 102 as a transformation event within the queue. Once the transformation event has been added to a queue within the analytics service, the executable code associated with each of the other linked charts 108, may access the queue to obtain the transformation event and determine what transformations need to be performed in order to mirror the original chart 102. For example, each transformation event may specify the new common data metric range for an axis of the charts 102, 108, as well as the bounds of this range (e.g., maximum and minimum values for the data metric) for the axis. For example, if a customer compresses the amount of time displayed on a particular axis from six hours to three hours, with an upper bound of 6 pm on January 18 and a lower bound of 3 pm on the same day, the transformation event may include these bounds and the range for the time axis.

When the executable code for a linked chart 108 obtains the transformation event from the queue, the executable code may determine what transformation needs to be performed and whether it is a non-trivial transformation. For example, if a linked chart 108 utilizes an axis that has the same axis range and bounds as the original chart 102, or within a particular tolerance (e.g., within a few minutes for the upper and lower bounds, range differs by a few minutes, etc.), the executable code may determine that the transformation is trivial and not perform the transformation specified within the transformation event. If the transformation is non-trivial, the executable code may determine whether the necessary data is available for performing the transformation of the original data line 110 in the linked chart 108 to obtain and display a transformed data line 112. For instance, the executable code may maintain a cache that is configured to store a particular amount of data for a range of variables that may be used to update the chart 108 as needed. However, if the transformation requires data that is not stored within this cache, the executable code may access a remote data repository to obtain the necessary data in order to perform the transformation. In some embodiments, if the necessary data is unavailable, the executable code may cause the GUI to display a notification to the customer that the requested data is unavailable.

Once the executable code for the linked chart 108 has obtained the necessary data from either the local cache or the remote data repository maintained by the analytics service, the executable code may utilize this data to perform the necessary transformation of the original data line 110 to obtain and display the transformed data line 112. Additionally, the executable code may update the various axes of the linked chart 108 to satisfy the axis changes made to the original chart 102. Thus, the charts 102, 108, upon transformation, may share a common axis, which may include the same range and same bounds.

In an embodiment, the GUI enables the customer to utilize a cursor to hover over a particular data line 104 associated with a computing resource to cause the chart 102 to highlight the data line 104 and dim other lines for other computing resources displayed on the chart 102. Additionally, the chart 102 may display relevant information about the particular computing resource when the corresponding data line 104 is highlighted. For instance, the chart 102 may display an identifier of the computing resource, the value of the data point selected within the data line 104 and the like. When the customer utilizes the cursor to hover over a particular data line 104 within the chart 102 causing the chart 102 to highlight the data line 104, the GUI may cause the other charts 108 to also highlight a data line 108 corresponding to the selected computing resource. This may enable the customer to easily visualize data for a particular computing resource across a variety of charts 102, 108 by merely hovering over a data line 104 within a single chart 102.

Similar actions may be synchronized across the various charts 102, 108 displayed on the GUI if the charts 102, 108 are linked. For instance, if the customer utilizes the cursor or other tactile operation to generate a bounding box around a portion of a chart 102 to zoom into the portion of the chart 102, the GUI may cause the other linked charts 108 to display a similar bounding box to enable the customer to visualize the effect of zooming into a particular data region. Thus, when the original chart 102 performs the requested transformation, the other linked charts 108 may perform the same transformations and maintain the same data metric axis that is the basis for the transformation.

It should be noted that while the charts 102, 108 illustrate a line chart, the charts 102, 108 may include pie charts, column charts, bar charts, area charts, scatter charts, stock charts, surface charts, bubble charts, radar charts, and the like. Additionally, or alternatively, the charts 102, 108 may include three-dimensional modeling element visualizations, such as computational fluid dynamics visualizations, finite element modeling result visualizations and the like.

Figure 2:
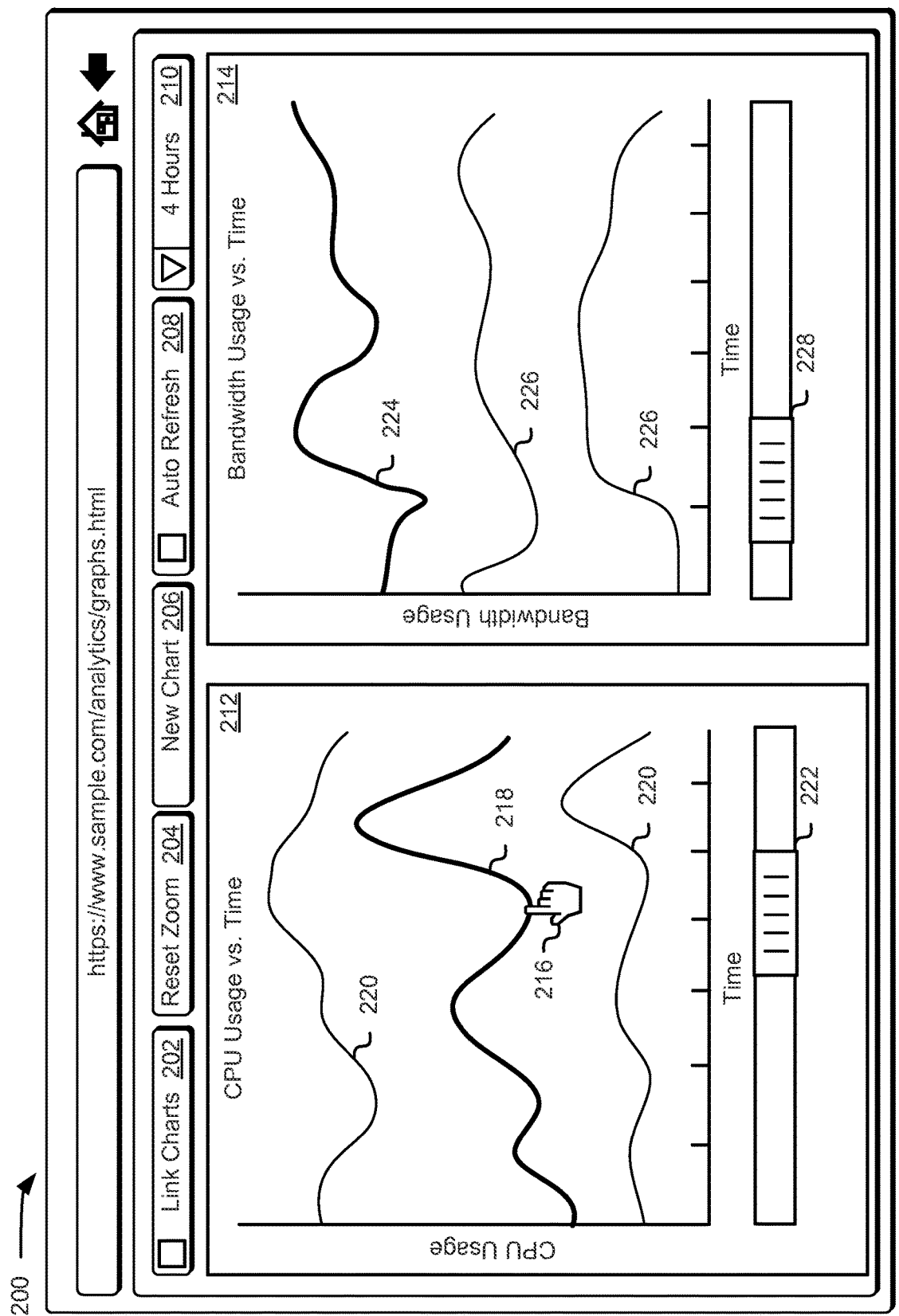
FIG. 2 shows an illustrative example of a graphical user interface in which selection of a particular data line for a computing resource in a chart results in the selection of other data lines for the computing resource within other charts in accordance with at least one embodiment.

As noted above, a customer may utilize a cursor to hover over any data lines within a chart to cause the chart to highlight the selected data line within the chart. Further, by hovering over a data line within a particular chart, the GUI may cause any other charts displayed on the GUI to highlight the data line that corresponds to the same computing resource as the source of the data line within the active chart. Accordingly, FIG. 2 shows an illustrative example of a GUI 200 in which selection of a particular data line 218 for a computing resource in a chart 212 results in the selection of other data lines 224 for the computing resource within other charts 214 in accordance with at least one embodiment. The GUI 200 may provide customers of the computing resource service provider or administrators of various computing resources with a cursor 216, which may be used to interact with any of the charts 212, 214 presented on the GUI 200. It should be noted that in some embodiments, the GUI 200 may not include a cursor 216. For instance, if the GUI 200 is accessed through a device comprising a touchscreen interface (e.g., smartphone, tablet computer, etc.), a user of the GUI 200 may contact the surface of the touchscreen interface to interact with the GUI 200. The GUI 200 may detect this contact and determine what operations are to be performed based at least in part on the tactile contact made by the user of the device.

In addition to the cursor 216, the GUI 200 may include a variety of toggles and buttons that may be used to generate and modify various charts 212, 214 within the GUI 200. For instance, the GUI 200 may include a link charts toggle 202, which a user may utilize to link various charts 212, 214 together. As illustrated in FIG. 2, the link charts toggle 202 has not been enabled, signifying that the charts 212, 214 have not been linked. Thus, the charts 212, 214 may include varying data metric ranges and bounds, as there has been no established link between the charts 212, 214 to cause the charts 212, 214 to utilize a common range and a common set of bounds for a common data metric (e.g., time).

The GUI 200 may further include a reset zoom button 204, which a user of the GUI 200 may select to reset an active chart 212 and any linked charts to a default data range. For instance, as will be described in greater detail below in connection with FIG. 4, a user may utilize the cursor 216 to generate a bounding box around a portion of a chart 212 to request that the chart 212 be zoomed in to magnify the data included within the bounding box. By selecting the reset zoom button 204, the GUI 200 may cause the chart 212 to revert back to a default view before any zooming operations were performed. For instance, if the default view included a particular axis range and bounds for the two or more axes of the chart 212, the GUI 200 may cause the chart 212 to transform the various data lines 218, 220 to include the data bounded by these axes ranges and bounds.

The new chart button 206 may enable the user of the GUI 200 to request creation of one or more new charts that may be displayed through the GUI 200. When the user of the GUI 200 selects the new chart button 206, the GUI 200 may present to the user a new interface, which may enable the user to specify the particular parameters for the new charts to be created. For instance, through this interface, the user may specify the data metric to be used for each axis, the computing resources for which data is to be displayed within this new chart, color preferences for each data line, data line styles, and the like. When the user of the GUI 200 has specified his/her preferences for this new chart, the GUI 200 may adjust the aspect ratio for each of the present charts 212, 214 to create space for the newly generated chart. In some embodiments, if creation of a new chart would result in compression of other charts 212, 214 to the point that these other charts 212, 214 would be difficult to read by a user, the GUI 200 may introduce a scroll bar, which would enable the user to scroll over to the newly generated chart without having to compress the other charts 212, 214 previously generated for the user.

The GUI 200 may further include an auto refresh toggle 208, which when selected by the user may cause any changes made to a chart to be performed automatically and cause the chart to display these changes. For instance, if a user utilizes the scroll bar 222 or other navigational user interface elements to change the upper and lower bounds of the time axis, the chart 212 may be automatically updated to show the data corresponding to times between these new upper and lower bounds. The data lines 218, 220 may be updated to illustrate this data for the user. In some embodiments, if the charts 212, 214 are linked and the auto refresh toggle 208 has been selected, a change to a single chart 212 may cause the GUI 200 to update all other linked charts 214 automatically to match the settings of the single chart 212. For example, if the user makes a change to a chart 212, the GUI 200 may add a transformation event to a queue, which an executable code or sub-routing associated with any other linked chart 214 may access to determine what transformations need to be performed to match the configuration of the original chart 212. If the auto refresh toggle 208 is not selected, the transformation event may not be added to the the queue unless the user manually selects a refresh option within the linked charts.

In addition to these buttons and toggles, the GUI 200 may include a fixed data metric drop down menu 210, which may enable a user of the GUI 200 to specify a particular range for the common data metric for all charts 212, 214. For instance, as illustrated in FIG. 2, the fixed data metric drop down menu is set to four hours, signifying that the time data metric, which is common for all charts 212, 214 should be set for a four hour range. If the user opts to refresh any chart 212, 214 or the auto refresh toggle 208 is enabled; a selection of a new value from the fixed data metric drop down menu 210 may cause an active chart 212 to be updated to include the new data metric range and data corresponding to the new range. If the charts 212, 214 are linked, selection of a new value within the fixed data metric drop down menu 210 may cause the GUI 200 to generate a transformation event for the queue in addition to updating the active chart 212. This may cause each linked chart 214 to access the queue, obtain the transformation event, and perform the necessary transformations to match the configuration of the active chart 212.

Each chart 212, 214 may include, for at least on data metric axis, a scroll bar 222, 228 or other navigational user interface elements, which the user of the GUI 200 may utilize to change the upper and lower bounds of the associated data metric. For example, as illustrated in FIG. 2, a user may utilize the cursor 216 to select a scroll bar 222 and slide the scroll bar 222 to the left or to the right to change the upper and lower bound values for time. Accordingly, the GUI 200 may update the chart 212 to display the data corresponding to these time values for the various data lines 218, 220. The size of the scroll bar 222, 228 may correspond to the range of data points available for the particular data metric. Thus, each extreme corners of the scroll bar 222, 228 may correspond to the first and last available data points. In some embodiments, if the user of the GUI 200 changes the displayed range for a particular data metric, the GUI 200 may resize the scroll bar 222, 228 in proportion to the changes made to the range. For instance, if the range is decreased, the scroll bar slider may be reduced in size to provide a user with a greater range of motion for the scroll bar 222, 228 and enable the user to access all available data points. In other embodiments, the scroll bar 222, 228 may not be bounded, such that if a user slides the scroll bar slider to either extreme, the upper and lower bounds of the data metric may continue to change, regardless of whether the data is available or not.

In an embodiment, the user of the GUI 200 may utilize the cursor 216 to hover over a data line 218 to obtain additional information about the particular data line, the associated computing resource, and the closest data point on the data line 218 closest to the cursor 216. Additionally, when the user utilizes the cursor 216 to hover over the data line 218, the GUI 200 may highlight the data line 218 within the chart 212 and dim any other data line 220 within the particular chart 212. Additionally, for the other charts 214 presented to the user through the GUI 200, the GUI 200 may further highlight other data lines 224 corresponding to the same computing resource associated with the selected data line 218. Any other data lines 226 within these other charts 214 may also be dimmed. This may increase the visibility of the selected data line 218 and may enable the user to see the other data lines 224 associated with the computing resource.

Figure 3:
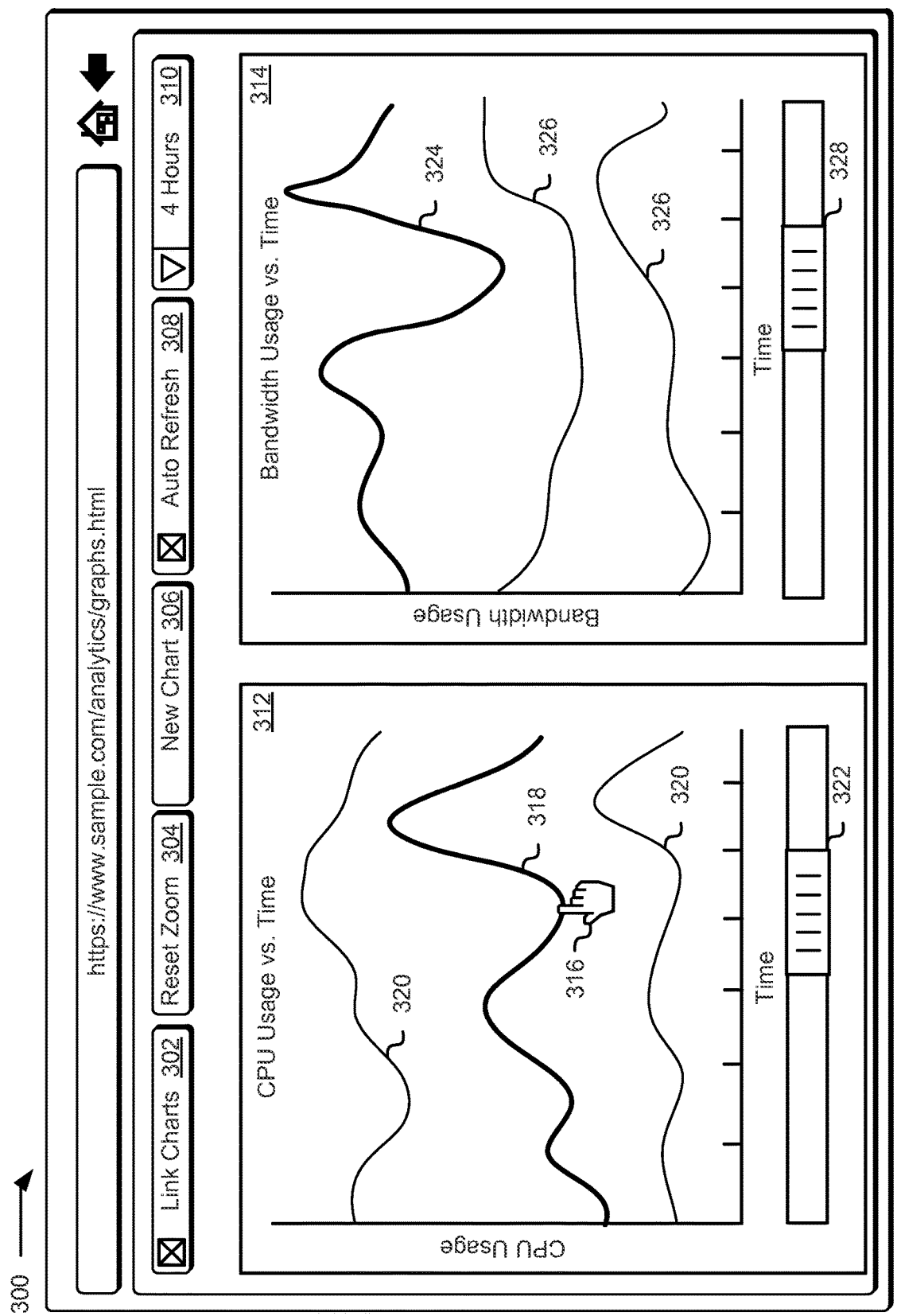
FIG. 3 shows an illustrative example of a graphical user interface in which one or more charts are linked such that the one or more charts display data for a particular data range in accordance with at least one embodiment.

As noted above, a user of the GUI may utilize a link charts toggle to link a variety of charts displayed through the GUI. If the charts are linked, the GUI may cause any linked charts to be updated to mirror the configuration of an active chart. Accordingly, FIG. 3 shows an illustrative example of a graphical user interface 300 in which one or more charts are linked such that the one or more charts 312, 314 display data for a particular data range in accordance with at least one embodiment. The GUI 300 may be similar to the GUI described above in connection with FIG. 2. For instance, the GUI 300 may include the link charts toggle 302, a reset zoom button 304, a new chart button 306, auto refresh toggle 308 and a fixed data metric drop down menu 310.

As illustrated in FIG. 3, the user has selected the link charts toggle 302 and the auto refresh toggle 308. As a result, the GUI 300 may generate a transformation event for any linked charts 314 that may cause these linked charts 314 to be updated to mirror the configuration of the active chart 312. This transformation event may be added to an event queue provided by the analytics service. The executable code or sub-routine usable to generate each linked chart 314 may access the queue in response to a triggering event to obtain the transformation event. For instance, if the user has selected the link charts toggle 302, the executable code or sub-routine may access the queue in response to the user's selection of the auto refresh toggle 308, the user's manual request to refresh the particular linked charts 314, or after a particular period of time has elapsed.

The executable code or sub-routine for a linked chart 314 may evaluate the transformation event to determine the transformation that needs to be performed and whether the transformation is trivial or not. If the transformation is not trivial, the executable code or sub-routine may determine whether the data is available through a chart cache or if the executable code or sub-routine is required to access a data repository maintained by the analytics service to obtain the data needed to update the chart 314. Once the executable code or sub-routine has obtained the data from either the cache or the data repository, the executable code or sub-routine may utilize this data to apply the necessary transformation of the data lines 324, 326. Further, the executable code or sub-routine may modify the common data metric axis (e.g., time) to match the data metric axis of the active chart 312. As a result, the scroll bars 322, 328 may be similar since the data range for the active chart 312 and the linked charts 314 may be the same or relatively close to one another.

As with the GUI described above in FIG. 2, if a user utilizes the cursor 316 to hover a particular data line 318 within an active chart 312, the GUI 300 may highlight the selected data line 318 while dimming the other data lines 320 within the active chart 312 to make visualization of the selected data easier for the user. Additionally, the GUI 300 may cause any other charts 314 to highlight data lines 324 corresponding to the same computing resource selected through the active chart 312. All other data lines 326 may be dimmed in order to enable the user to easily visualize data for a selected computing resource across the various charts 312, 314 presented to the user through the GUI 300.

Figure 4:
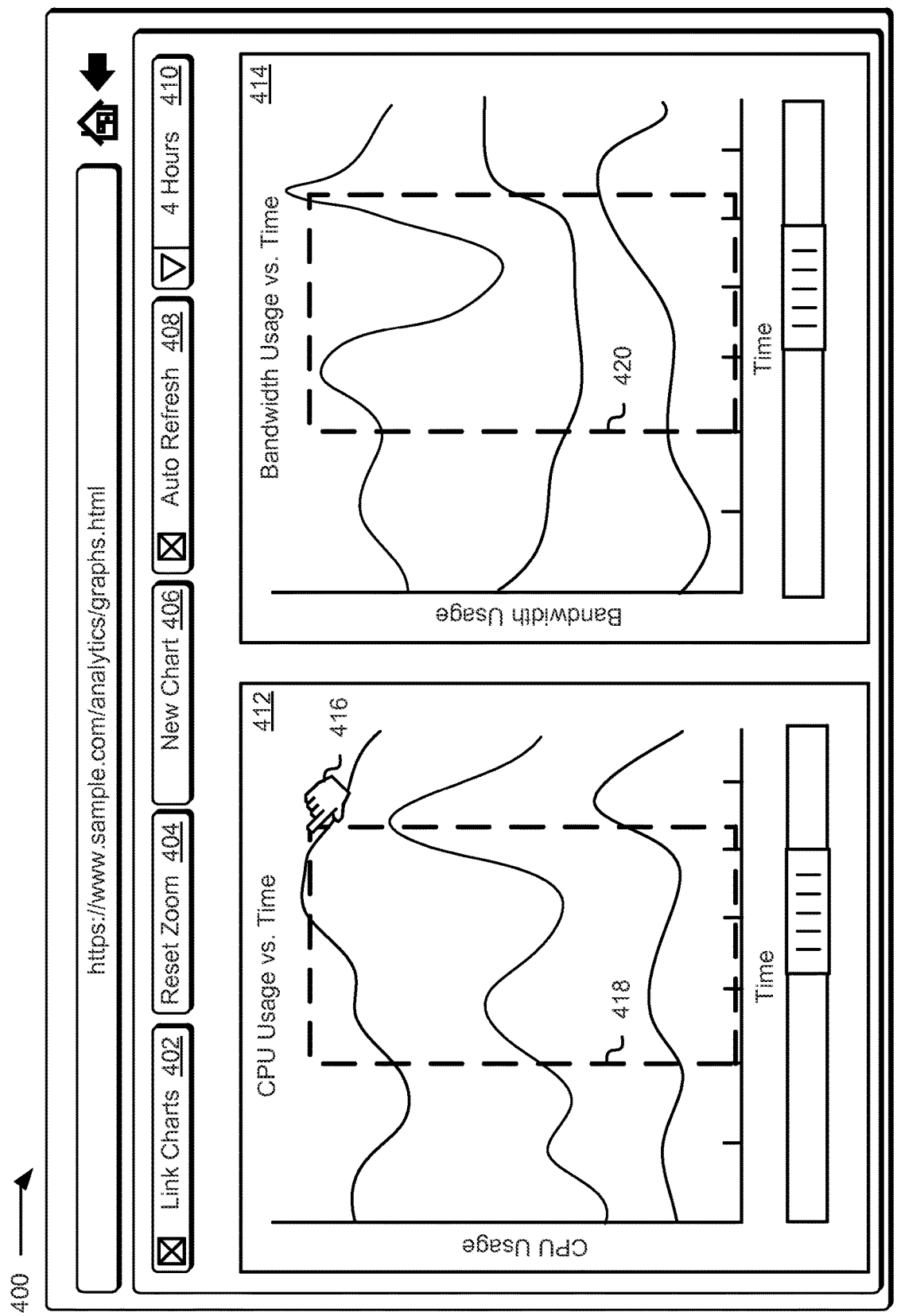
FIG. 4 shows an illustrative example of a graphical user interface in which selection of a data region within a particular chart results in a similar selection to occur in other linked charts in accordance with at least one embodiment.

As noted above, a user of the GUI may utilize a cursor to generate a bounding box around a portion of a chart to request that the chart be zoomed in to magnify the data included within the bounding box. If the various charts displayed within the GUI are linked, the GUI may generate additional bounding boxes within the other charts to illustrate the data to be magnified. Accordingly, FIG. 4 shows an illustrative example of a graphical user interface 400 in which selection of a data region within a particular chart 412 results in a similar selection to occur in other linked charts 414 in accordance with at least one embodiment. The GUI 400 may be similar to those described above in connection with FIGS. 2 and 3 and may include the link charts toggle 402, a reset zoom button 404, a new chart button 406, auto refresh toggle 408 and a fixed data metric drop down menu 410.

In the GUI 400, a user has utilized a cursor 416 to create a bounding box 418 around a particular area of the active chart 412. This bounding box 416 may be created by the user to specify an area of the active chart 412 that he/she would like magnified in order to analyze the data included within the active chart 412 in greater detail. If the active chart 412 is linked to a variety of other charts 414 displayed within the GUI 400, the GUI 400 may generate a similar bounding box 420 within these other charts 414 to enable the user to see the relevant area that is to be magnified within these other charts 414. In some embodiments, if the user has selected the link charts toggle 402 but the linked charts 414 have not been updated to have the same or similar configuration as that of the active chart 412, the bounding box 420 within these linked charts 414 may be either larger or smaller dependent upon the difference in the range for the common data metric for the active chart 412 and the linked charts 414.

For example, if the time range for the active chart 412 has a particular range and bounds, the bounding box 420 may be smaller within the linked chart 414 if the time range within the active chart 414 has a greater range. Further, if the bounds are different for the active chart 412 and the linked charts 414, the bounding box 420 may be positioned in a different relative position to that displayed within the active chart 412.

In an embodiment, even if the common data metric range is identical for the active chart 412 and the linked charts 414, the bounding boxes 418, 420 may differ. For instance, the variable data metric (e.g., CPU Usage and Bandwidth Usage, as illustrated in FIG. 4), may have different ranges within each chart 412, 414. Under such circumstances, the GUI 400 may calculate the percentage of the total range within the active chart 412 that is to be magnified and utilize this calculated percentage to determine the magnification range for any of the linked charts 414. Alternatively, if the user creates a bounding box within the active chart 412 that includes a particular number of data lines, the GUI 400 may create a bounding box within the linked charts 414 that has the same common data metric range but also includes the same particular data lines as those selected within the active chart 412.

Once the user releases the cursor 416 to acknowledge acceptance of the created bounding box 416, the GUI 400, through an executable code or sub-routine associated with the active chart 412, may determine, based at least in part on the coordinates of each corner of the bounding box 416, what transformations need to be performed in order to update the active chart 412. Once the executable code or sub-routine has performed the required data transformations to update the chart 412 as needed, the executable code or sub-routine may make available (e.g., publish) a transformation event to the queue within the analytics service. Subsequently, each of the linked charts 414 may access this queue to obtain the transformation event and determine, based at least in part on the transformations performed within the active chart 412, what transformation are required to update the linked charts 414 in a manner that maintains the linkage between the active chart 412 and these linked charts 414. Subsequently, the executable code or sub-routine associated with each of these linked charts 414 may obtain the data necessary to perform the transformations and update the linked charts 414.

Figure 5:
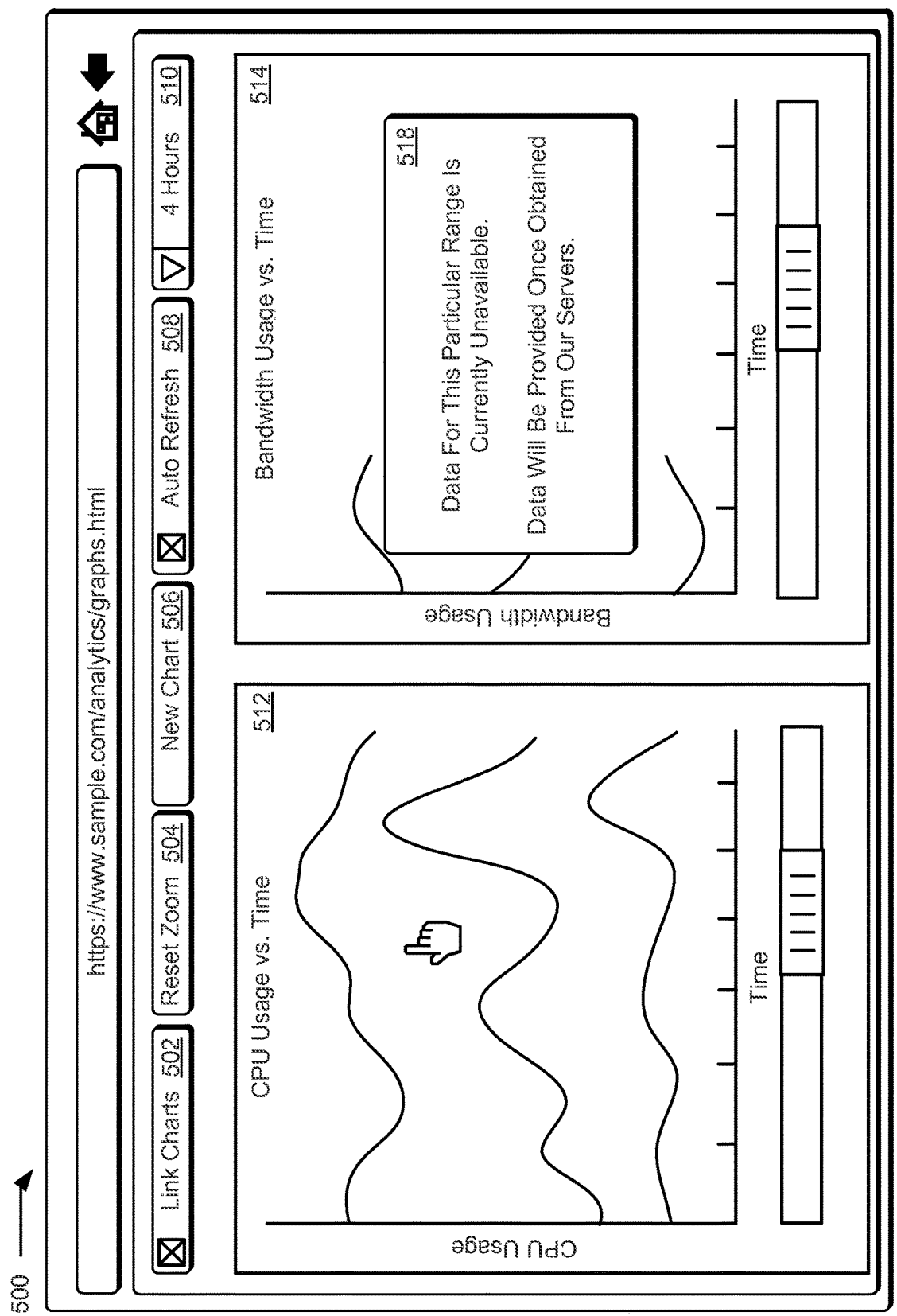
FIG. 5 shows an illustrative example of a graphical user interface in which data for a particular data range is unavailable for one or more metrics within a linked chart upon transformation of data within a different chart in accordance with at least one embodiment.

In some embodiments, when the executable code or sub-routine attempts to obtain data necessary to update a linked chart, the necessary data may be unavailable. For instance, if the analytics service only recorded certain types of data for a long period of time, any other data may not be available for earlier time periods. Under such circumstances, the GUI may notify the user, through the linked chart, that the data requested is unavailable. Accordingly, FIG. 5 shows an illustrative example of a graphical user interface 500 in which data for a particular data range is unavailable for one or more metrics within a linked chart 514 upon transformation of data within a different chart 512 in accordance with at least one embodiment. The GUI 500 may be similar to those described above in connection with FIG. 2-4 and may include the link charts toggle 502, a reset zoom button 504, a new chart button 506, auto refresh toggle 508 and a fixed data metric drop down menu 510.

As noted above, if the various charts 512, 514 are linked, through selection of the link charts toggle 502, any changes made to an active chart 512 may result in changes to any linked chart 514 if the changes are not trivial. For instance, each linked chart 514 may be supported by an individual executable code or sub-routine, which may include a cache for storing an amount of data that may be used to transform the various data lines within the linked chart 514 as necessary. Additionally, or alternatively, the executable code or sub-routine may access a data repository provided by the analytics service to obtain the necessary data to update the linked chart 514. However, in some instances, the necessary data may not be available, either through the cache or the data repository. For example, if the analytics service only started collecting data for a particular data metric after a significant amount of data has been collected for other data metrics, data for the particular data metric may be scarce or non-existent if earlier data is obtained for other data metrics.

If the executable code or sub-routine for the linked chart 514 is unable to obtain the data necessary to perform the necessary data transformations, the executable code or sub-routine may update the linked chart 514 with any available data for the particular data metrics. Additionally, or alternatively, the executable code or sub-routine may cause the GUI 500 to display a notification dialog box 518, which may provide the user with information detailing the unavailability of the requested data. In some embodiments, if the necessary data is not stored within the cache, such that the executable code or sub-routine has to obtain this data from the data repository maintained by the analytics service, the executable code or sub-routine may cause the GUI 500 to display the notification dialog box 518 until the data is obtained and the transformation is performed successfully.

In some embodiments, rather than displaying the notification dialog box 518 in the event that the necessary data is unavailable, the executable code or sub-routine may adjust the transformation in a manner that is distinct from the transformation of the first chart. For instance, the executable code may transform the chart 514 in a manner such that the nearest available data to the requested data is displayed within the linked chart 514. This may prevent the GUI 500 from having to display incomplete linked charts 514 to the user in the event that the necessary data for transformation is unavailable. Additionally, this may enable the user to select, from this linked chart 514, a new data metric range for updating all other charts presented by the GUI 500.

In an alternative embodiment, if the transformation event for the active chart 512 involves one or more computing resources not represented through a linked chart 514, the executable code or sub-routine for the linked chart 514 will not transform the linked chart 514. For instance, when a transformation event is made available through an event queue, the executable code or sub-routine for the linked chart 514 may obtain the transformation event and determine whether the event is applicable to the linked chart 514. For example, the executable code or sub-routine may determine whether the transformed chart is one that is linked to the linked chart 514. If so, the executable code or sub-routine for the linked chart 514 may determine whether the transformation applies to any computing resource data lines illustrated within the linked chart 514. If the transformation is not applicable to any of the computing resource data lines illustrated within the linked chart 514, the executable code or sub-routine may ignore this transformation event and maintain the current display of the linked chart 514. This may prevent the presentation of a chart with no data.

Figure 6:
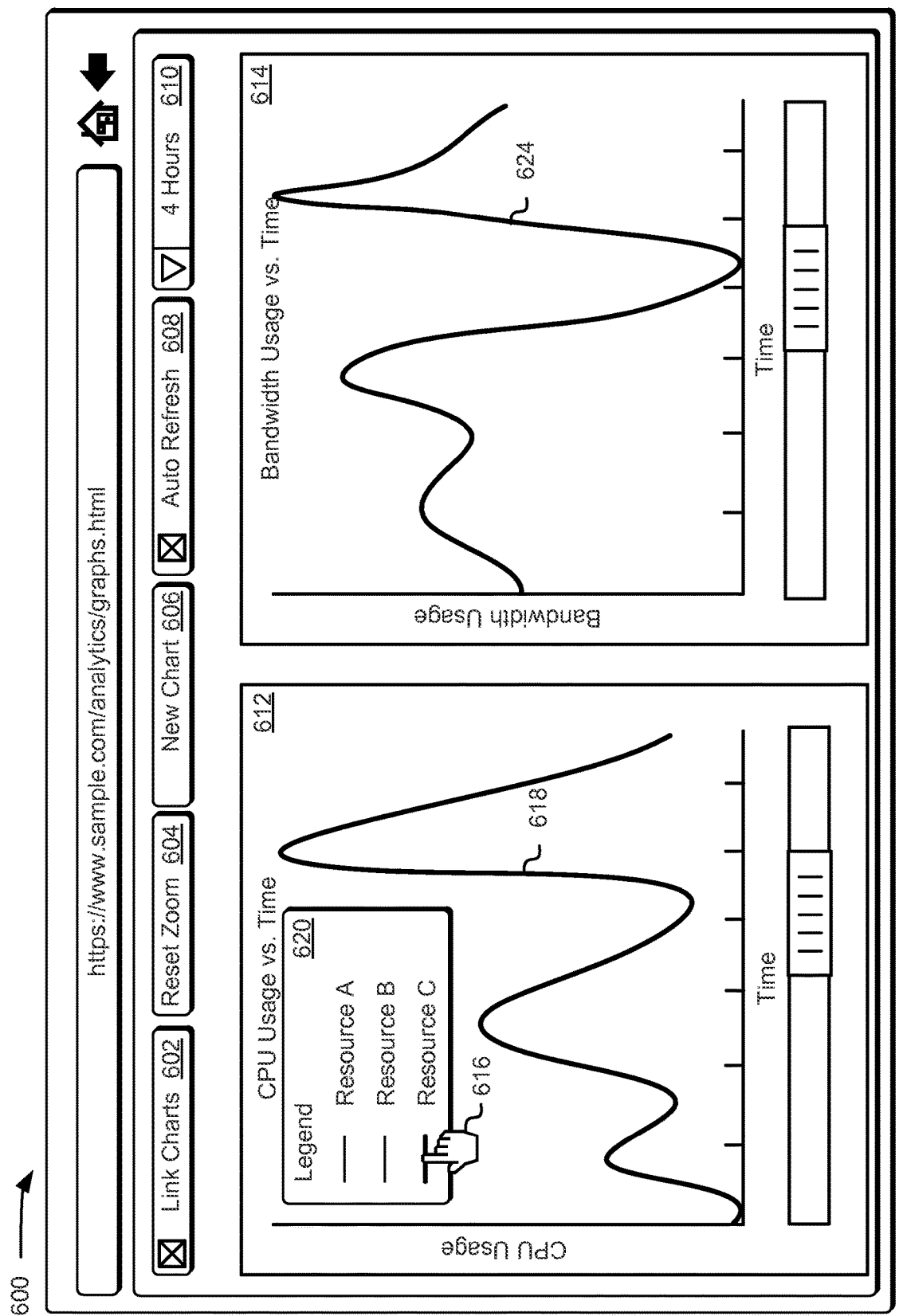
FIG. 6 shows an illustrative example of a graphical user interface in which selection of a computing resource line within a legend results in the charts displaying data lines associated only with the selected computing resource in accordance with at least one embodiment.

In an embodiment, the GUI includes a legend, which may specify, through the use of one or more computing resource labels, which computing resources are represented through the various charts displayed on the GUI. Further, the legend may illustrate different data line styles and colors for each computing resource label that may be used to represent data for each computing resource represented through the various charts. Accordingly, FIG. 6 shows an illustrative example of a graphical user interface 600 in which selection of a computing resource line within a legend 620 results in the charts 612, 614 displaying data lines 618, 624 associated only with the selected computing resource in accordance with at least one embodiment. The GUI 600 may be similar to those described above in connection with FIG. 2-5 and may include the link charts toggle 602, a reset zoom button 604, a new chart button 606, auto refresh toggle 608 and a fixed data metric drop down menu 610.

The user of the GUI 600 may utilize the cursor 616 to hover over a computing resource label or sample data line associated with the computing resource label within the legend 620 that represents each data line 618, 624 associated with a particular computing resource. When the user utilizes the cursor 616 to hover over the computing resource label or the sample data line, the GUI 600 may highlight the sample data line for the selected computing resource label while dimming any other sample data lines displayed within the legend 620. This may serve as an indication to the user that he/she has selected a particular computing resource for further analysis. Additionally, when the user of the GUI 600 utilizes the cursor 616 to select a particular computing resource through the legend 620, the GUI 600 may update the charts 612, 614 to display only data lines 618, 624 for the selected computing resource. Thus, any other data lines for other computing resources may be removed or obscured to enable enhanced viewing of the selected data.

In an embodiment, when the user of the GUI 600 utilizes the cursor 616 to select a particular computing resource through a computing resource label within the legend 620, the GUI 600 will update the axes of the charts 612, 614 and transform the data lines 618, 624 to conform to the changes made to the axes. For example, as illustrated in FIG. 6, when the user of the GUI 600 utilizes the cursor 616 to select a data line for Resource C in the legend 620, the GUI 600 may update the "CPU Usage" axis for chart 612 and the "Bandwidth Usage" axis for chart 614 based at least in part on maximum and minimum data values for the respective data lines 618, 624. As noted above, each linked chart 612, 614 may be supported by an individual executable code or sub-routine, which may include a cache for storing an amount of data that may be used to transform the various data lines within the linked chart 612, 614 as necessary. Additionally, or alternatively, the executable code or sub-routine may access a data repository provided by the analytics service to obtain the necessary data to update the linked chart 612, 614. Thus, when the GUI 600 updates the axes for the charts 612, 614, the executable code or sub-routine may obtain the data necessary to transform the respective data lines 618, 624.

Figure 7:
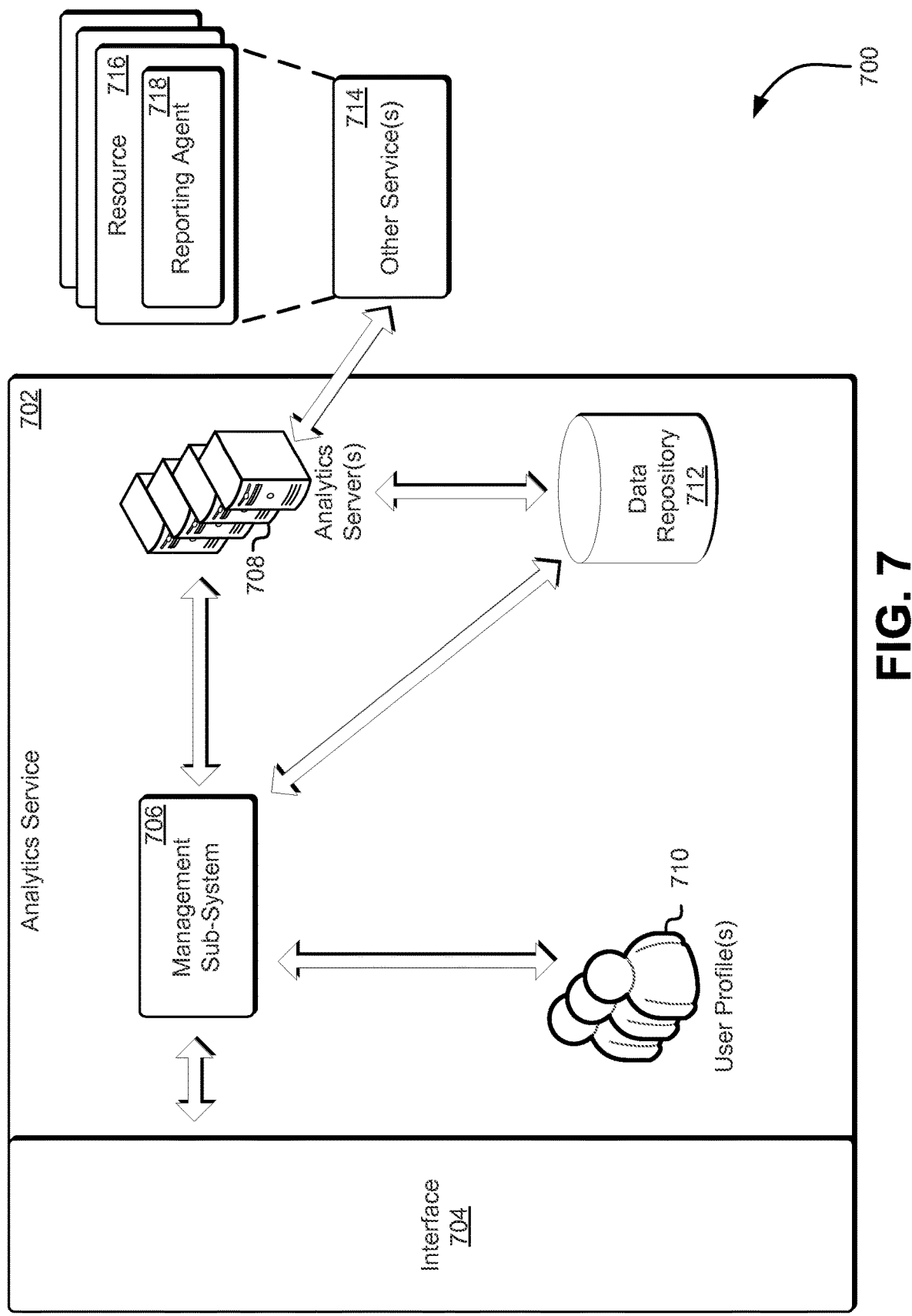
FIG. 7 shows an illustrative example of an environment in which various components of an analytics service are configured to obtain data from one or more services and display the data within one or more charts through an interface in accordance with at least one embodiment.

As noted above, the GUI may be provided to the user by an analytics service, which may be configured to obtain data from a variety of other services provided by the computing resource service provider to enable data visualization through use of the GUI. Accordingly, FIG. 7 shows an illustrative example of an environment 700 in which various components of an analytics service 702 are configured to obtain data from one or more services 714 and display the data within one or more charts through an interface 704 in accordance with at least one embodiment. In the environment 700, the analytics service 702 may provide users with an interface 704, which the users may interact with in order to generate a variety of charts that may include data associated with the user's computing resources. The interface 704 may include any of the GUIs described above in connection with FIGS. 2-6.

Through the interface 704, a user may request creation of one or more charts that may be used to graphically illustrate data for a variety of computing resources using two or more data metrics. For instance, when the user first accesses the interface 704, the interface 704 may obtain from the user a set of credentials that may be used to identify any computing resources allocated to the user. For example, the interface 704 may provide this set of credentials to a management sub-system 706, which is configured to access a user profile data store 710 and, based on a user profile corresponding to the set of credentials provided by the user, identify any computing resources allocated to the user. Based at least in part on this information obtained from the user profile data store 710, the management sub-system 706 may update the interface 704 to provide the user with identifiers for each of his/her computing resources for which data may be available. This may enable the user to utilize the interface 704 to select the one or more computing resources which he/she would like to obtain data for and the data metrics to be utilized for each chart that is to be presented through the interface 704.

Based at least in part on the user's selection of his/her computing resources and associated data metrics, the interface 704 may provide this information to the management sub-system 706, which may access a data repository 712 to determine whether the necessary data is available. The data repository 712 may include data for a variety of computing resources 716 provided by other services 714 of the computing resource service provider. For instance, the analytics service 702 may include one or more analytics servers 708 which may be configured to receive various data from the other services 714 provided by the computing resource service provider. Each of these other services 714 may include a number of computing resources 716, which may be utilized by the user for his/her business needs. These computing resources 716 may each include a reporting agent 718, which may be configured to log the user's usage of the computing resource 716 and record any data associated with the computing resource 716 over time. As the reporting agent 718 collects this data, the reporting agent 718 may transmit this data to the analytics server 708 which, in turn, may store this data within the data repository 712. The data stored within the data repository 712 may be categorized based at least in part on the computing resource 716 whence the data was obtained, the corresponding service 714 and any other identifiers (e.g., user identifier, data center location, etc.) that may be used to distinguish the data stored within the data repository 712.

Once the user of the interface 704 has selected the data to be displayed, the management sub-system 706 may obtain the requested data from the data repository 712. If the data is not available through the data repository 712, the management sub-system 706 may transmit a request to the one or more analytics servers 708 to obtain the data from the computing resources 716. The management sub-system 706, upon obtaining the required data from either the data repository 712 or the one or more analytics servers 708, may transmit the data to the interface 704, which may generate the charts and enable the user to interact with these charts as needed.

Through the interface 704, a user may specify whether the various charts displayed are to be linked. For instance, as illustrated in FIGS. 2-6, the interface 704 may include a link charts toggle, which, when selected, may cause the interface 704 to link all charts together. Alternatively, the user may specify which charts, of a totality of charts, are to be linked. When a user utilizes the interface 704 to manipulate a linked chart, the interface 704 may record the user's interaction with the linked chart and transmit these interactions to the management sub-system 706 in the form of the request. The request may specify the method and form of data transformation that is to be performed. For instance, if the user, through the interface 704, specifies that he/she wishes to zoom into a particular area of the chart, the interface 704 may determine the area that the user wishes to have magnified and provide this information to the management sub-system 706.

In response to this request, the management sub-system 706 may evaluate the request to determine what transformation is to be performed and whether the transformation is trivial. For instance, if the user, through the interface 704, utilizes a scroll bar slider to change the upper and lower bounds of a particular axis but immediately returns the slider to the original position (e.g., the user clicks on the slider and holds down a button to maintain control of the slider), the interface 704 may register a minimal transformation of the active chart. Thus, in such circumstances, the transformation may be trivial and the management sub-system 704 may disregard such transformations. However, if the transformation is not trivial, the management sub-system 706 may determine whether the required data for the transformation has been cached within an executable code or sub-routine associated with the active chart in the interface 704. If the data has not been cached, the management sub-system 706 may access the data repository 712 to obtain the required data for the transformation. Once the management sub-system 706 has obtained the required data, the management sub-system 706 may provide the data to the executable code or sub-routine, which may apply the transformation.

If the charts provided through the interface 704 are linked, the management sub-system 706 may further make available a transformation event to an event queue. The queue may include a queue specifying various transformation events for a variety of linked charts. For instance, the transformation event may specify the transformation performed within the active chart and an identifier for the active chart. This may enable the executable code or sub-routine for each of the linked charts to determine whether an available transformation event is applicable to the particular linked chart. Each executable code or sub-routine may be configured to access this queue after a particular period of time has passed or in response to a triggering event, such as a user selection of the link charts toggle and the auto refresh toggle within the interface 704.

If the executable code or sub-routine for a linked chart determines, based at least in part on a transformation event, that a required transformation is not trivial, the executable code or sub-routine may transmit a request to the management sub-system 706 to obtain the necessary data for performing the required transformation. The management sub-system 706 may subsequently determine whether the required data is already stored in the cache for the particular linked chart and, if so, return a response to the executable code or sub-routine to perform the transformation, as no data retrieval is required through the data repository 712. However, if the required data is not stored in cache, the management sub-system 706 may access the data repository 712 to determine whether the required data is available. If unsuccessful in obtaining the data from the data repository 712, the management sub-system 706 may transmit a request to the one or more analytics servers 708 to access the relevant computing resources 716 referenced through the charts displayed through the interface 704 and their corresponding reporting agents 718 to determine whether the requested data is available. If the data is not available through the reporting agents 718, the management sub-system 706 may report, to the executable code or sub-routine, an error. This may cause the executable code or sub-routine to generate a notification dialog box through the interface 704, which may be used to notify the user that the data is unavailable to perform the requested transformation.

If the required data is available, whether through the data cache for the linked chart or through the data repository, the executable code or sub-routine may perform the required transformation. This may result in an update of the linked chart such that it shares a common range, upper bound and lower bound for at least one data axis with the active chart. Further, the executable code or sub-routine may modify a scroll bar for the common data axis to match the scroll bar of the active chart. Thus, any modification of a linked chart may result in transformations for each of the other linked charts, resulting in a fluid change across all linked charts.

Figure 8:
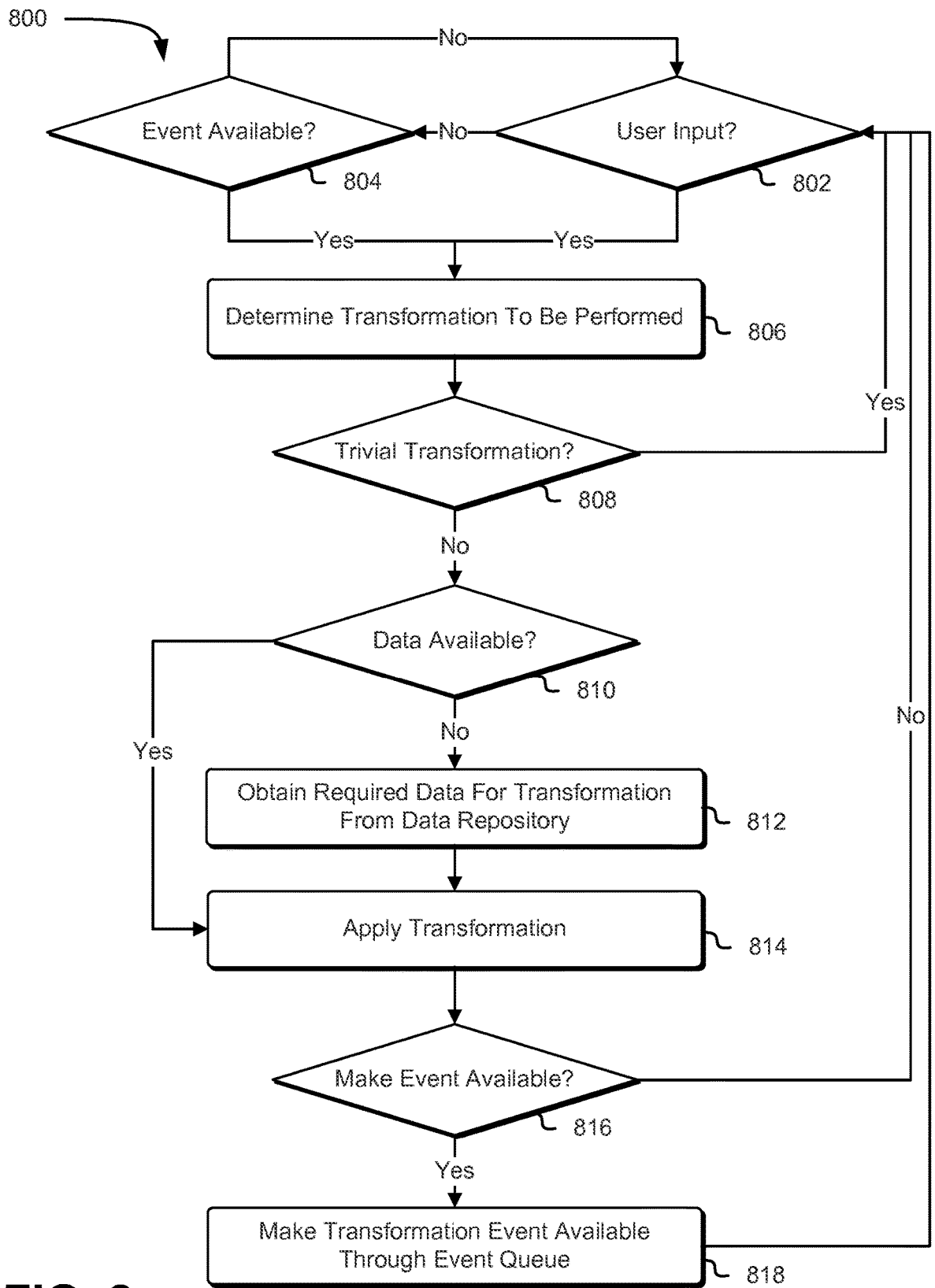
FIG. 8 shows an illustrative example of a process for performing a data transformation within a particular chart in response to an available transformation event or user input in accordance with at least one embodiment.

As noted above, a user may interact with one or more charts displayed on a GUI to transform the data as he/she desires. Additionally, if the various charts are linked, any change made to a linked chart may result in similar changes to be performed for each of the other linked charts. Accordingly, FIG. 8 shows an illustrative example of a process 800 for performing a data transformation within a particular chart in response to an available transformation event or user input in accordance with at least one embodiment. The process 800 may be performed by an analytics service and executable code or sub-routines associated with a chart displayed through the GUI. The analytics service may be configured to interact with a data repository and one or more analytics servers to obtain any data required for data transformations. The executable code or sub-routines may be configured to process user inputs, interact with a queue to identify any relevant transformation events, and perform any transformations as required.

The GUI may include one or more charts, which may be linked to one another by a user selection of the link charts toggle, such as the link charts toggle illustrated in FIGS. 2-6. At any time, a user, through the GUI, may manipulate a particular chart to display certain data through one or more data lines on the chart. For instance, a user may utilize the GUI to zoom in to a particular area of a chart or utilize a scroll bar to obtain data for different end bounds of a particular data metric. The chart may be supported by an executable code or sub-routine, which may determine 802 whether the user has provided input that may result in transformation of the data displayed through the chart. If the user has not provided any input, the executable code or sub-routine may determine 804 whether a transformation event is available which may require transformation of the chart. For instance, the executable code or sub-routine may access an event queue to determine whether there any transformation events apply for the chart.

If the executable code or sub-routine has not received any user input and has not been able to identify any transformation events that apply for the chart, the executable code or sub-routine may continue to await user input or an applicable transformation event. For instance, the executable code or sub-routine may be configured to access a queue after a certain period of time has passed or in response to a triggering event (e.g., user selects the linked charts toggle and the auto refresh toggle through the interface) to determine 804 whether an applicable transformation event is available. However, if the executable code or sub-routine receives user input or obtains a transformation event from the queue, the executable code or sub-routine may determine 806 what transformation needs to be performed. For instance, the executable code or sub-routine may evaluate the user's input to identify the parameters of the transformation (e.g., data metric ranges, upper and lower bounds for each axis, etc.). Alternatively, if the executable code or sub-routine obtains a transformation event from a queue, the executable code or sub-routine may evaluate the transformation event to obtain the parameters of the transformation.

Based at least in part on the parameters of the transformation, the executable code or sub-routine may determine 808 whether the transformation to be performed is trivial. For instance, if the user, through the GUI, slides a scroll bar to a new position and immediately back to the original position, the executable code or sub-routine may register a negligible user interaction with the particular chart. This negligible user interaction may result in a minimal transformation that may be deemed trivial. Alternatively, the executable code or sub-routine may evaluate the transformation event and determine that the transformation parameters result in a minimal transformation of the linked chart, which may be deemed trivial. In some embodiments, the transformation to be performed relates to data associated with a particular computing resource specified in the transformation event. If the linked chart does not include any data lines for the affected computing resource, the executable code or sub-routine for the linked chart may determine that the transformation is trivial, as no data is presented within the linked chart that requires transformation. If the transformation to be performed is deemed to be trivial, the executable code or sub-routine may discard to transformation and await additional user input or transformation events.

If the transformation is not trivial, the executable code or sub-routine may determine 810 whether the data necessary for performance of the transformation is available within a data cache for the chart. For instance, when the chart is initially created, the executable code or sub-routine may store, within this data cache, additional data that may be used as part of any subsequent transformations. This may obviate the need to access the analytics service and the data repository to obtain the necessary data. If the data cache does not include the necessary data for performing the required transformation, the executable code or sub-routine may transmit a request to a management sub-system of the analytics service to obtain 812 the required data for the transformation from the data repository. In response to the request, the management sub-system may access the data repository to obtain the necessary data. In some embodiments, if the necessary data is not stored within the data repository, the management sub-system may transmit a request to one or more analytics servers, which may cause these one or more analytics servers to access one or more computing resources associated with the data to be transformed to determine whether these computing resources maintain the necessary data. If the necessary data is still unavailable, the management sub-system may transmit a notification to the executable code or sub-routine that the requested data could not be found. This may cause the executable code or sub-routine, through the interface, to notify the user that the data is unavailable.

Once the executable code or sub-routine receives the necessary data from the management sub-system or obtains the data from the data cache for the chart, the executable code or sub-routine may apply 814 the transformation specified by the user or through the transformation event.

This may include changing the appearance of the chart to display new data metric ranges and bounds for each axis, modification of the data lines within the chart to conform to the changes in the axes and the data corresponding to these changes, and the like. Additionally, the executable code or sub-routine may modify any user interface tools within the chart to match the transformation performed. For instance, the executable code or sub-routine may modify a scroll bar for each axis in a manner that is proportional to the ratio of the displayed data range and the total available data range for the particular data metric.

The executable code or sub-routine, once the transformation has been applied, may determine 816 whether a transformation event needs to be made available in order to cause the other linked charts to be updated to mirror the changes made to the chart. For instance, if the transformation was performed as a result of user manipulation of the chart, the other linked charts may need to be updated. Thus, under such circumstances, the executable code or sub-routine may make available 818 a transformation event to the queue. This may cause the executable code or sub-routines of the other linked charts to obtain the available event from the queue and perform their own transformations. If the transformation was performed as a result of a transformation event, the executable code or sub-routine may instead await further user input or other transformation events without making a new transformation event available.

Figure 9:
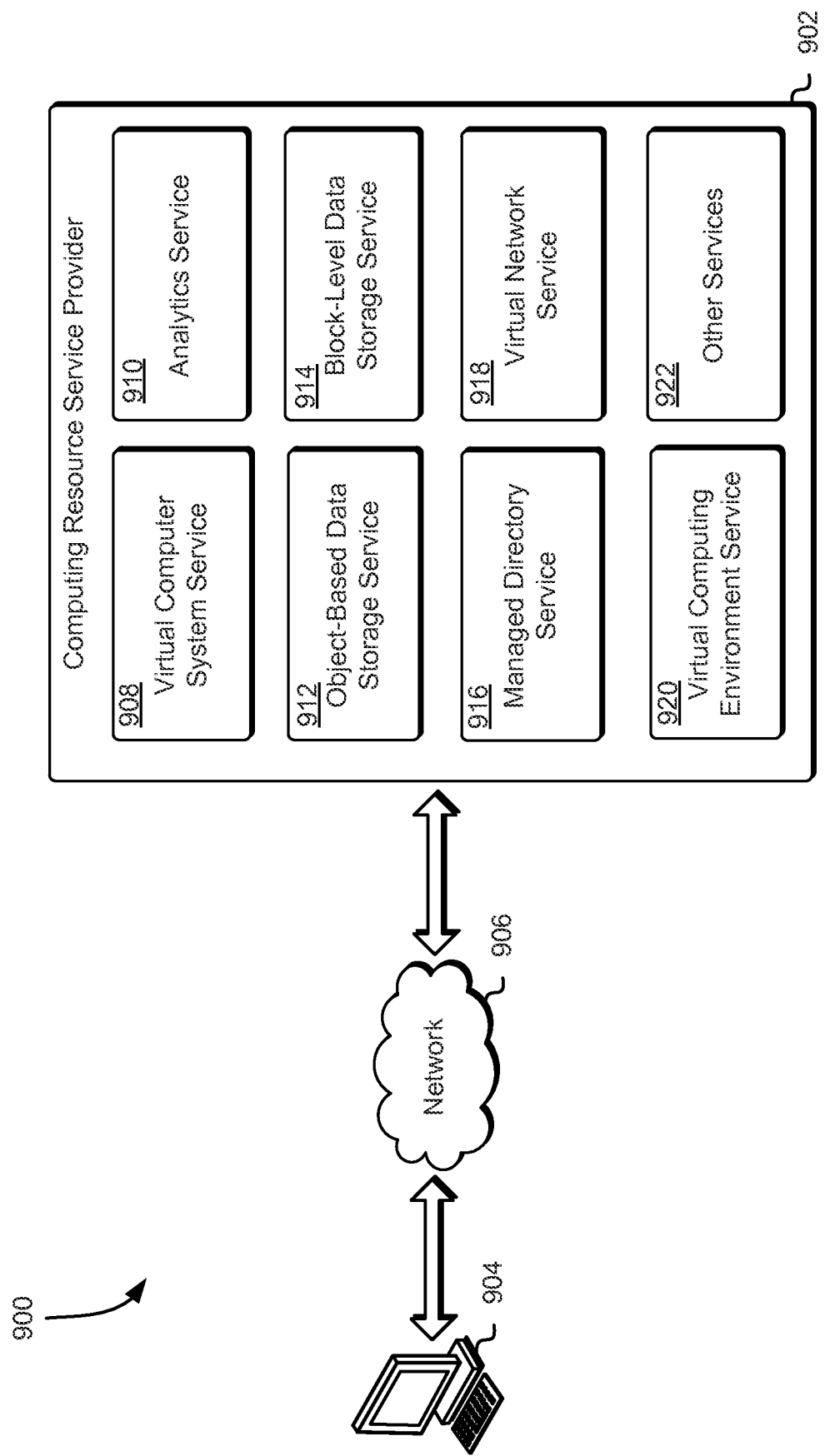
FIG. 9 shows an illustrative example of an environment in which various embodiments can be implemented.

FIG. 9 shows an illustrative example of an environment 900 in which various embodiments can be implemented. In the environment 900, a computing resource service provider 902 may provide a variety of services to a customer 904 or other users. The customer 904 may be an organization that may utilize the various services provided by the computing resource service provider 902 to remotely generate and maintain one or more resources and provide a mapping of user roles for use within a customer network to enable management of one or more delegated access permissions to define a level of access for users of his or her resources. As illustrated in FIG. 9, the customer 904 may communicate with the computing resource service provider 902 through one or more communications networks 906, such as the Internet. Some communications from the customer 904 to the computing resource service provider 902 may cause the computing resource service provider 902 to operate in accordance with various techniques described herein or variations thereof.

As noted above, a computing resource service provider 902 may provide various computing resource services to its customers. For instance, in this particular illustrative example, the computing resource service provider 902 provides at least seven types of services. The services provided by the computing resource service provider, in this example, include a virtual computer system service 908, an analytics service 910, an object-based data storage service 912, a block-level data storage service 914, a managed directory service 916, a virtual network service 918, a virtual computing environment service 920 and one or more other services 922, although not all embodiments of the present disclosure will include all such services and additional services may be provided in addition to or as an alternative to services explicitly described herein.

The virtual computer system service 908 may be a collection of computing resources configured to instantiate virtual machine instances onto virtual computer systems on behalf of the customers 904 of the computing resource service provider 902. Customers 904 of the computing resource service provider 902 may interact with the virtual computer system service 908 to provision and operate virtual computer systems that are instantiated on physical computing devices hosted (e.g., physical hosts) and operated by the computing resource service provider 902. The virtual computer systems may be used for various purposes, such as to operate as servers supporting a website. Other applications for the virtual computer systems may be to support database applications, electronic commerce applications, business applications and/or other applications.

The analytics service 910 may be a collection of computing resources configured to obtain and aggregate data for a variety of different data metrics from other services provided by the computing resource service provider 902. This data may be presented to customers 904 through an interface provided by the analytics service 910. Customers 904 may utilize the interface to generate a variety of different charts, which may include data for a variety of computing resources allocated to these customers 904. In an embodiment, a customer 904 can specify, through the interface, that some or all of the charts presented through the interface should be linked. Thus, if the customer 904 provides input to a linked chart to transform the data illustrated therein, applications or sub-routines associated with the other linked charts may obtain a transformation event created as a result of the customer's 904 changes to the active chart and, if the required transformation is not trivial, perform the necessary transformations to allow a customer 904 to view data for a variety of data metrics using one common data metric range and bounds (e.g., same time range, etc.).

The object-based data storage service 912 may comprise a collection of computing resources that collectively operate to store data for a customer 904. The data stored in the data storage service 912 may be organized into data objects. The data objects may have arbitrary sizes except, perhaps, for certain constraints on size. Thus, the object-based data storage service 912 may store numerous data objects of varying sizes. The object-based data storage service 912 may operate as a key value store that associates data objects with identifiers of the data objects which may be used by the customer to retrieve or perform other operations in connection with the data objects stored by the object-based data storage service 912. Access to the object-based data storage service 912 may be through appropriately configured API calls.

The block-level data storage service 914 may comprise a collection of computing resources that collectively operate to store data for a customer. For instance, the block-level data storage system may be configured to provide block-level data storage volumes for use with a virtual machine instance, as noted above. A customer may interact with the block-level data storage service 914 to provision a block-level data storage volume that, in turn, may be mounted as a storage device (e.g., hard drive) onto a virtual machine instance. The storage volume may be configured to behave like a raw, unformatted block storage device with a block level customer interface. Accordingly, a customer, through properly configured API calls to the service, may create a file system on top of the block-level data storage volumes or utilize the volume as a block-level storage device (e.g., a hard drive).

The managed directory service 916 may provide a variety of services to enable computer systems and/or computer system client devices to access customer directories including, but not limited to, authentication, authorization and directory services. For example, the managed directory service 916 may provide authentication services which may authenticate credentials of a user, computer system, process, automated process or other such entity to at least determine whether that entity is authorized to access the managed directory service 916 and/or the customer directories associated with the managed directory service 916. In some embodiments, the credentials may be authenticated by the managed directory service 916 itself, or they may be authenticated by a process, program or service under the control of the managed directory service 916, or they may be authenticated by a process, program or service that the managed directory service 916 may communicate with, or they may be authenticated by a combination of these and/or other such services or entities.

The managed directory service 916 may also provide authorization services which may authorize a user, computer system, process, automated process or other such entity to at least determine which actions of one or more possible actions that entity may perform. Examples of actions that an entity may or may not be authorized to perform include, but are not limited to, creating directories on the customer directory, destroying directories on the customer directory, attaching to directories on the customer directory, detaching from directories on the customer directory, providing access links to directories on the customer directory, reclaiming access links to directories on the customer directory, allowing reads from directories on the customer directory, allowing writes to directories on the customer directory and/or other such actions.

The managed directory service 916 may also provide directory services which may provide an authenticated entity access to the customer directories according to the authorization credentials and/or policies. For example, in an embodiment where a computer system entity may be authorized to read and write a certain data store on a customer directory, the ability to do so may be provided by the directory services. Directory services may provide access to customer directories by providing links to the customer directory locations such as by a URI object or some other such linkage. As may be contemplated, the URI may be provided by the computer system client device, or by a process running at the data center, or by a process running on a computer system connected to the data center, or by the managed directory service 916, or by a combination of these and/or other such computer system entities.

The virtual network service 918 may enable customers to provision a logically isolated virtual network within the computing resource service provider 902 environment. Within this isolated virtual network, a customer 904 may be able to define a range of IP addresses for various computing resources and configure network gateways and virtual network interfaces to enable public communications with these computing resources. Through the virtual network service 918, a customer 904 may be able to create a network connection between his/her on-premises network and the virtual network, such that the computing resources within the computing resource service provider 902 environment may be able to access computing resources located within the customer's on-premises network.

The virtual computing environment service 920 may allow customers 904 to interact, through the interface, with one or more virtual computing environments. For instance, the virtual computing environment service 920 may enable customers 904 to remotely manage and maintain one or more virtual machine images. These virtual machine images may be maintained in data storage within a virtual machine image data store. When a customer 904 submits a request for provisioning a virtual machine instance, the virtual computing environment service 920 may identify the machine image the customer 904 has requested and allocate the resources necessary (e.g., the processors and random-access memory (RAM) required to operate the components of the machine image) to process the machine image. The machine image may be instantiated on one or more physical storage devices (e.g., one or more servers or hard drives) that may act as a physical host for the instance. The virtual computing environment may be configured to communicate with one or more managed directories through the managed directory service 916 or through a directory domain controller within the customer's 904 on-premises network.

Figure 10:
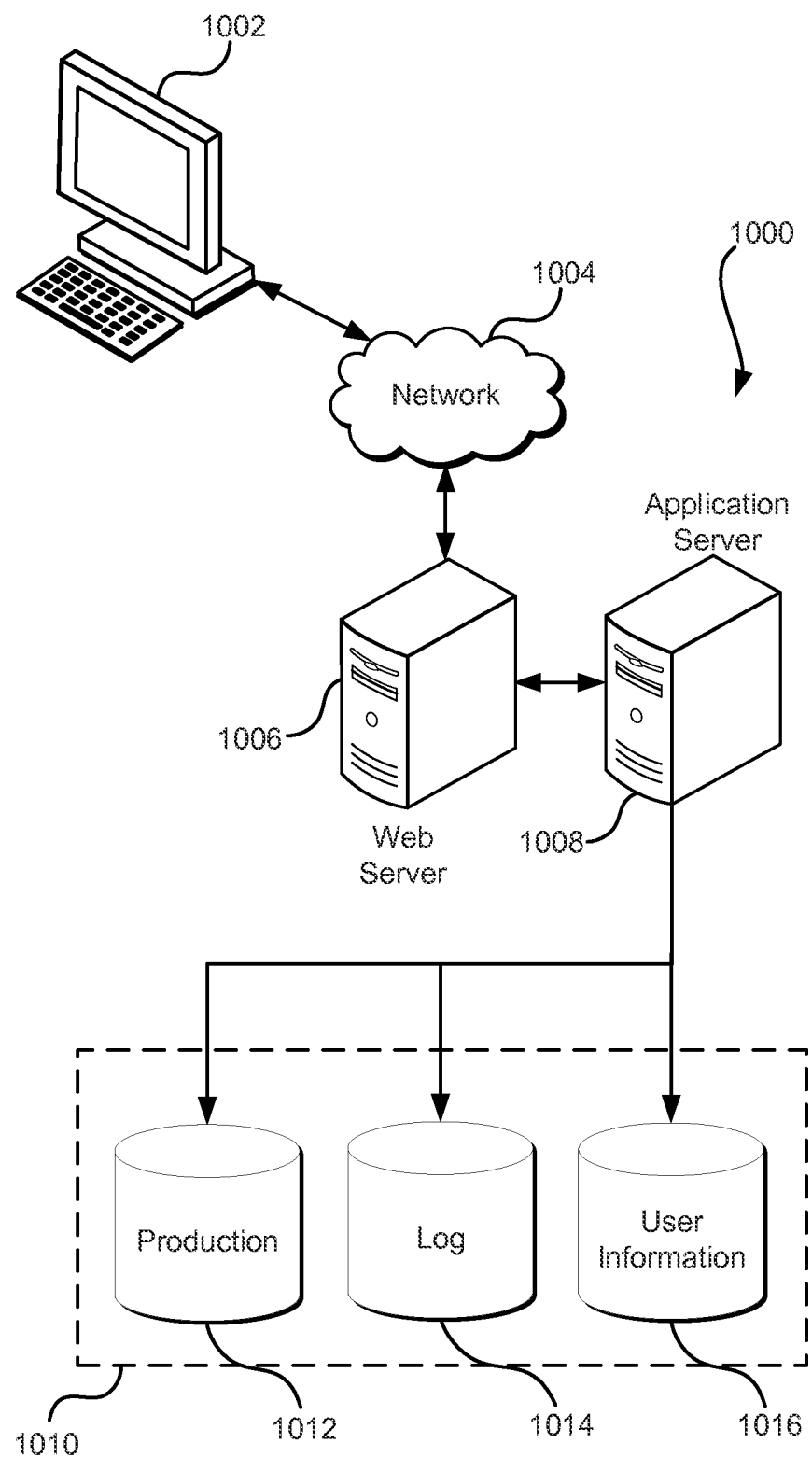
FIG. 10 shows an illustrative example of an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network 1004 can include any appropriate network, including an intranet, the Internet, a cellular network, a local area network, a satellite network or any other network and/or combination thereof. Components used for such a system can depend at least in part upon the type of network and/or environment selected. Protocols and components for communicating via such a network are well known and will not be discussed in detail. Communication over the network 1004 can be enabled by wired or wireless connections and combinations thereof. In this example, the network 1004 includes the Internet, as the environment includes a web server 1006 for receiving requests and serving content in response thereto, although for other networks an alternative device serving a similar purpose could be used as would be apparent to one of ordinary skill in the art.

The illustrative environment includes an application server 1008 and a data store 1010. It should be understood that there could be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server 1008 can include any appropriate hardware, software and firmware for integrating with the data store 1010 as needed to execute aspects of one or more applications for the electronic client device 1002, handling some or all of the data access and business logic for an application. The application server 1008 may provide access control services in cooperation with the data store 1010 and is able to generate content including, text, graphics, audio, video and/or other content usable to be provided to the user, which may be served to the user by the web server 1006 in the form of HyperText Markup Language ("HTML"), Extensible Markup Language ("XML"), JavaScript, Cascading Style Sheets ("CSS"), or another appropriate client-side structured language. Content transferred to a client device may be processed by the electronic client device 1002 to provide the content in one or more forms including, forms that are perceptible to the user audibly, visually and/or through other senses including touch, taste, and/or smell. The handling of all requests and responses, as well as the delivery of content between the electronic client device 1002 and the application server 1008, can be handled by the web server 1006 using PHP: Hypertext Preprocessor ("PHP"), Python, Ruby, Perl, Java, HTML, XML, or another appropriate server-side structured language in this example. It should be understood that the web server 1006 and application server 1006 are not required and are merely example components, as structured code discussed can be executed on any appropriate device or host machine as discussed elsewhere. Further, operations described as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store 1010 may include mechanisms for storing production data 1012 and user information 1016, which can be used to serve content for the production side. The data store 1010 also is shown to include a mechanism for storing log data 1014, which can be used for reporting, analysis or other purposes. It should be understood that there can be many other aspects that may need to be stored in the data store 1010, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other applications may be generated by server-side structured languages as described or may be provided by a content management system ("CMS") operating on, or under the control of, the application server 1008. In one example, a user, through a device operated by the user, might submit a search request for a certain type of item. In this case, the data store 1010 might access the user information 1016 to verify the identity of the user and can access the catalog detail information to obtain information about items of that type. The information then can be returned to the user, such as in a results listing on a web page that the user is able to view via a browser on the electronic client device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the example environment 1000 in FIG. 10 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network 1004 can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network 1004. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
   presenting, on a user interface, a plurality of linked charts;
   receiving user input indicative of a transformation to a parameter of a first chart of the plurality of linked charts, the transformation to the parameter corresponding to a requested change to a field of view of the first chart on the user interface, the transformation to the parameter of the first chart of the plurality of linked charts causing a request for additional data to be presented in the first chart that is not presented in the first chart and not presented previously in the first chart during a display chart session, the first chart comprising at least two dimensions whereby a dimension of the first chart corresponds to a first data metric;
   updating the first chart in accordance with the transformation of the parameter of the first chart;
   determining whether an amount of the transformation to the parameter exceeds a threshold transformation;
   as a result of the first chart being updated and a determination that the amount of the transformation to the parameter exceeds the threshold transformation, making available a transformation event indicative of the transformation of the parameter of the first chart;
   obtaining, from a remote data repository, a set of data for a second chart of the plurality of linked charts, the second chart comprising at least two dimensions whereby a dimension of the second chart corresponds to a second data metric that is different from the first data metric; and
   transforming the second chart of the plurality of linked charts based at least in part on the set of data and in accordance with the transformation of the parameter of the first chart.

2. The computer-implemented method of claim 1, wherein the method further comprises:
   receiving user input indicating a link between the first chart and the second chart; and
   causing executable code for the second chart to change the second chart based at least in part on the transformation of the first chart and executable code for the first chart to transform the first chart based at least in part on a transformation of the second chart.

3. The computer-implemented method of claim 1, wherein the method further comprises:
   updating one or more navigational user interface elements of the first chart in accordance with the transformation of the parameter of the first chart, the navigational user interface elements capable of being manipulated by user input to navigate the first chart; and
   updating one or more navigational user interface elements of the second chart in accordance with the transformation of the parameter of the first chart.

4. The computer-implemented method of claim 1, wherein the method further comprises:
   receiving, within the first chart of the plurality of linked charts, user input indicative of a selection of a data line of a computing resource;
   updating the first chart in accordance with the selection of the data line; and
   updating the second chart of the plurality of linked charts in accordance with the selection of the data line such that a visual appearance of a second data line of the computing resource is updated within the second chart.

5. The computer-implemented method of claim 1, further comprising:
   receiving different user input indicative of a different transformation to the parameter of the first chart of the plurality of linked charts;
   updating the first chart in accordance with the different transformation of the parameter of the first chart, wherein the first chart is updated by changing an appearance of the first chart; and
   as a result of a determination that the different transformation to the parameter does not exceed the threshold transformation, retaining the appearance of the second chart.

6. A system, comprising:
   one or more processors; and
   memory including instructions that, as a result of being executed by the one or more processors, cause the system to at least:
      update a first chart of a plurality of linked charts, at least in part by applying a transformation to the first chart, the transformation to the first chart indicated by a user input, the first chart comprising at least two dimensions whereby a dimension of the first chart corresponds to a first data metric, the user input causing a request for additional data to be presented in the first chart that is not presented in the first chart, the additional data not located in a data cache for the first chart, the user input corresponding to a requested change to a zoom of the first chart, the updated first chart including a presentation of the additional data;
      determine whether an amount of the transformation applied to the first chart exceeds a threshold transformation;
      as a result of the transformation being applied to the first chart and the determination that the amount of the transformation exceeds a threshold transformation, enqueue a transformation event corresponding to the transformation applied to the first chart; and transform a second chart of the plurality of linked charts based at least in part on the transformation of the first chart, the second chart comprising at least two dimensions whereby a dimension of the second chart corresponds to a second data metric that is different from the first data metric.

7. The system of claim 6, wherein the instructions that cause the system to transform the second chart of the plurality of linked charts based at least in part on transformation of the first chart, further include instructions that, as a result of being executed by the one or more processors, cause the system to, as a result of the transformation event being made available to the queue, obtain, from a remote data repository, a set of data for the second chart usable to transform the second chart.

8. The system of claim 6, wherein the first chart and the second chart are linked in response to user input indicating a link between the first chart and the second chart resulting in executable code for the second chart to transform the second chart based at least in part on the transformation of the first chart and executable code for the first chart to change the first chart based at least in part on transformation of the second chart.

9. The system of claim 6, wherein the instructions further cause the system to, in response to a selection of a data line within the first chart, update the second chart in accordance with the selection of the data line such that a visual appearance of a second data line is updated within the second chart.

10. The system of claim 6, wherein the instructions that cause the system to transform the second chart of the plurality of linked charts based at least in part on transformation of the first chart, further include instructions that, as a result of being executed by the one or more processors, cause the system to update one or more navigational user interface elements of the second chart in accordance with the transformation of the first chart.

11. The system of claim 6, wherein the plurality of linked charts are presented through a user interface configured to receive user input through one or more navigational user interface elements for transformation of at least one chart of the plurality of linked charts.

12. The system of claim 6, wherein the instructions further cause the system to, in response to detecting an available transformation event of the transformation of the first chart of the plurality of linked charts, access a queue to obtain the available transformation event to determine how to transform the second chart.

13. The system of claim 6, wherein the instructions further cause the system to:
  determine, based at least in part on an available transformation event, that a first subset of data necessary for transformation of a third chart in accordance with a transformation of the first chart is unavailable;
  obtain a second subset of the data necessary for transformation of the third chart that is available for transformation of the third chart; and
  transform the third chart based at least in part on the second subset of the data necessary for transformation of the third chart and in a manner that is distinct from the transformation of the first chart.

14. A non-transitory computer-readable storage medium comprising executable instructions that, as a result of being executed by one or more processors of a computer system, cause the computer system to at least:

update a first chart of a plurality of charts in accordance with a transformation of the first chart, the transformation of the first chart requested through provided user input and the first chart comprising at least two dimensions whereby a dimension of the first chart corresponds to a first data metric, the transformation of the first chart causing a request for additional data to be presented in the first chart that is not presented in the first chart, the transformation of the first chart corresponding to a requested change to a bounding of the first chart;

determining that the additional data is not stored in a data cache for the first chart;

determining whether an amount indicative of the transformation of the first chart exceeds a threshold transformation;

as a result of a determination that the amount indicative of the transformation exceeds the threshold transformation, make available a transformation event of the transformation of the first chart; and as a result of a transformation event of the transformation of the first chart being made available, cause a second chart of the plurality of charts, comprising at least two dimensions whereby a dimension of the second chart corresponds to a second data metric that is different from the first data metric, to detect the available transformation event of the transformation of the first chart such that the second chart is changed based at least in part on the available transformation event and in accordance with the transformation of the first chart.

15. The non-transitory computer-readable storage medium of claim 14, wherein the executable instructions further include instructions that, as a result of being executed by the one or more processors, cause the computer system to:
  update navigational user interface elements of the first chart in accordance with the transformation of the first chart, the navigational user interface elements capable of being manipulated by user input to navigate the first chart; and
  further cause the second chart to update one or more navigational user interface elements of the second chart in accordance with the transformation of the first chart.

16. The non-transitory computer-readable storage medium of claim 14, wherein the second chart is further transformed based at least in part on a set of data usable to transform the plurality of charts and obtained from a remote data repository for the second chart.

17. The non-transitory computer-readable storage medium of claim 14, wherein the executable instructions further include instructions that, as a result of being executed by the one or more processors, cause the computer system to:
  receive user input indicative of a selection of a computing resource label; and
  cause the second chart to be updated in accordance with the selection of the computing resource label such that data lines associated with the computing resource label within the second chart are updated.

18. The non-transitory computer-readable storage medium of claim 14, wherein the second chart accesses the available transformation event to determine how to transform the second chart.

19. The non-transitory computer-readable storage medium of claim 14, wherein the first chart and the second chart are linked in response to user input indicating a link between the first chart and the second chart resulting in executable code for the second chart to transform the second chart based at least in part on the transformation of the first chart and executable code for the first chart to transform the first chart based at least in part on transformation of the second chart.

20. The non-transitory computer-readable storage medium of claim 14, wherein the plurality of charts are presented through a user interface configured to receive user input through one or more navigational user interface elements for transformation of at least one chart of the plurality of charts.

21. The non-transitory computer-readable storage medium of claim 14, wherein the executable instructions further include instructions that, as a result of being executed by the one or more processors, cause the computer system to cause at least one chart, distinct from the first chart and the second chart, to:
- determine, based at least in part on the available transformation event, that a first subset of data necessary for transformation of the at least one chart in accordance with the transformation of the first chart is unavailable;
- obtain a second subset of the data necessary for transformation of the at least one chart that is available for transformation of the at least one chart; and
- transform the at least one chart based at least in part on the second subset of the data necessary for transformation of the at least one chart and in a manner that is distinct from the transformation of the first chart.

* * * * *